United States Patent
Dobaczewski et al.

(10) Patent No.: US 12,045,181 B2
(45) Date of Patent: Jul. 23, 2024

(54) SYSTEM AND METHOD FOR BLOCKING NON-SECURE INTERRUPTS

(71) Applicant: Cypress Semiconductor Corporation, San Jose, CA (US)

(72) Inventors: Jacek Dobaczewski, San Jose, CA (US); Kuo-Jui Sun, San Jose, CA (US)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 0 days.

(21) Appl. No.: 17/831,175

(22) Filed: Jun. 2, 2022

(65) Prior Publication Data

US 2023/0236998 A1    Jul. 27, 2023

Related U.S. Application Data

(60) Provisional application No. 63/303,917, filed on Jan. 27, 2022.

(51) Int. Cl.
*G06F 13/24* (2006.01)
*G06F 9/30* (2018.01)

(52) U.S. Cl.
CPC .......... *G06F 13/24* (2013.01); *G06F 9/30029* (2013.01)

(58) Field of Classification Search
CPC .............................. G06F 13/24; G06F 9/30029
See application file for complete search history.

(56) References Cited

U.S. PATENT DOCUMENTS

| | | | | |
|---|---|---|---|---|
| 7,130,951 B1* | 10/2006 | Christie | ................. | G06F 9/4812 710/262 |
| 2005/0138257 A1* | 6/2005 | Burdass | ................... | G06F 13/24 710/262 |
| 2005/0160210 A1* | 7/2005 | Watt | ....................... | G06F 9/4812 710/269 |
| 2006/0090084 A1* | 4/2006 | Buer | ....................... | G06F 21/53 713/189 |
| 2009/0177826 A1* | 7/2009 | Conti | .................... | G06F 21/554 710/262 |
| 2012/0036341 A1* | 2/2012 | Morfey | ..................... | G06F 9/48 712/E9.035 |
| 2016/0378699 A1* | 12/2016 | Warkentin | .............. | G06F 13/26 710/269 |
| 2018/0068134 A1* | 3/2018 | Schwarz | .................. | G06F 21/74 |
| 2022/0414271 A1* | 12/2022 | Gunyuzlu | ............... | G06F 21/31 |
| 2023/0177143 A1* | 6/2023 | Lichtenau | ............. | G06F 9/5027 726/22 |

* cited by examiner

*Primary Examiner* — Phong H Dang
(74) *Attorney, Agent, or Firm* — Cooper Legal Group LLC (57) ABSTRACT

One or more computing devices, systems, and/or methods are provided. In an example of the techniques presented herein, a system comprises a processor, a first interrupt source configured to generate a first non-secure interrupt, and an interrupt blocking unit configured to block the first non-secure interrupt responsive to the processor operating in a secure state.

20 Claims, 7 Drawing Sheets

SYSTEM AND METHOD FOR BLOCKING NON-SECURE INTERRUPTS

BACKGROUND

Some processors support secure and non-secure states. Program code may be stored in and executed from secure memory in the secure state or stored in and executed from non-secure memory in the non-secure state. Function calls may be used to change the operating state.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a system is provided. The system comprises a processor, a first interrupt source configured to generate a first non-secure interrupt, and an interrupt blocking unit configured to block the first non-secure interrupt responsive to the processor operating in a secure state.

In an embodiment of the techniques presented herein, a system is provided. The system comprises means for receiving a first non-secure interrupt, means for determining whether blocking is enabled for the first non-secure interrupt, and means for blocking the first non-secure interrupt based on a processor operating mode signal and responsive to the blocking being enabled for the first non-secure interrupt.

In an embodiment of the techniques presented herein, a method is provided. The method comprises receiving a first non-secure interrupt, determining whether blocking is enabled for the first non-secure interrupt, and blocking the first non-secure interrupt based on a processor operating mode signal and responsive to the blocking being enabled for the first non-secure interrupt.

In an embodiment of the techniques presented herein, an interrupt blocking unit is provided. The interrupt blocking unit comprises a first interrupt input port, a first interrupt output port, a hardware register configured to store a first block flag associated with the first interrupt input port and a processor operating mode parameter, and interrupt blocking logic configured to connect the first interrupt input port to the first interrupt output port responsive to the processor operating mode parameter having a first value and to isolate the first interrupt input port from the first interrupt output port responsive to the processor operating mode parameter having a second value and the first block flag having a first value.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

In processors that support secure and non-secure states, it is important to handle interrupts regardless of the current operating state without interfering with the processor operation and without introducing significant latency. For a case where a processor is operating in a secure state and a non-secure interrupt is processed, registers may be corrupted leading to thread crashing. Providing an environment where all secure calls are initiated using Supervisory Calls (SVC) reduces the likelihood of register corruption, but introduces significant latency for each SVC and secure call combination.

According to some embodiments, blocking for non-secure interrupts is provided in hardware when the processor is in a secure state. In the secure state, non-secure interrupts may be blocked individually based on mask flags stored in a hardware register, or all non-secure interrupts may be blocked based on a block enable signal. To enable non-secure interrupt blocking a hardware signal, a processor state signal, or a combination of both signals may be used.

Figure 1:
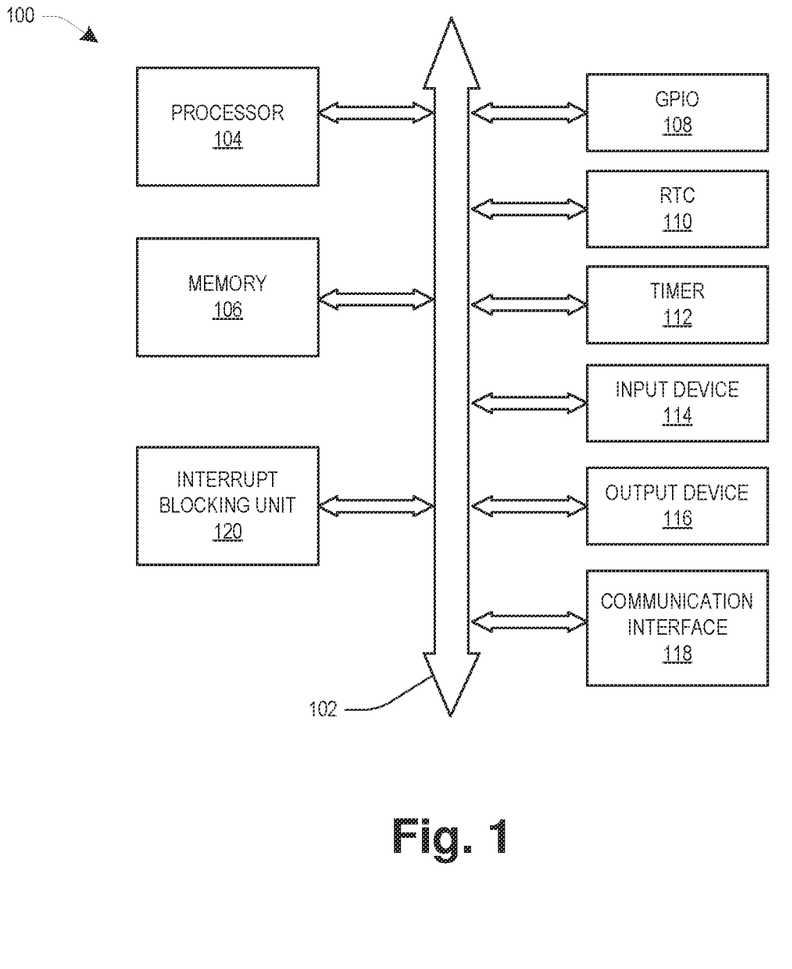
FIG. 1 is a diagram of a processing unit, in accordance with some embodiments.

FIG. 1 is a diagram of a system 100, in accordance with some embodiments. In some embodiments, the system 100 comprises a bus 102, a processor 104, a memory 106 that stores software instructions or operations, a general-purpose input/output (GPIO) port 108, a real-time clock (RTC) 110, a timer 112, an input device 114, an output device 116, a communication interface 118, and an interrupt blocking unit 120. The system 100 may include fewer components, additional components, different components, and/or a different arrangement of components than those illustrated in FIG. 1.

According to some embodiments, the bus 102 includes a path that permits communication among the components of the system 100. For example, the bus 102 may include a system bus, an address bus, a data bus, and/or a control bus. The bus 102 may also include bus drivers, bus arbiters, bus interfaces, and so forth. The processor 104 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. The processor 104 may be implemented as hardware (e.g., a microprocessor, etc.), a combination of hardware and software (e.g., a SoC, an ASIC, etc.), may include one or multiple memories (e.g., cache, etc.), etc.

In some embodiments, the processor 104 controls the overall operation or a portion of the operation(s) of the system 100. The processor 104 performs one or multiple operations based on an operating system and/or various applications or computer programs (e.g., software). The processor 104 accesses instructions from the memory 106, from other components of the system 100, and/or from a source external to the system 100 (e.g., a network, another device, etc.). The processor 104 may perform an operation and/or a process based on various techniques including, for example, multithreading, parallel processing, pipelining, interleaving, etc.

In some embodiments, the memory 106 includes one or multiple memories and/or one or multiple other types of storage mediums. For example, the memory 106 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other suitable type of memory. The memory 106 may include a hard disk, a magnetic disk, an optical disk, a magneto-optic disk, a solid state disk, a Micro-Electromechanical System (MEMS)-based storage medium, a nanotechnology-based storage medium, and/or some other suitable disk. The memory 106 may include drives for reading from and writing to the storage medium. The memory 106 may be external to and/or removable from the system 100, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). The memory 106 may store data, software, and/or instructions related to the operation of the system 100.

The GPIO port 108 handles both incoming and outgoing digital signals. Each pin of the GPIO port 108 may be freely set to function as either an input or an output pin. An input pin of the GPIO port 108 may be used to communicate to the processor 104 signals received from external devices, and an output pin of the GPIO port 108 may be used to drive outside operations based on processor instructions and calculation results. External interrupt signals may be provided on an input pin of the GPIO port 108 to the processor 104.

The RTC 110 and timer 112 enables accurate time measurements and time-of-day monitoring within the system 100, and may be used by processes that refer to or are dependent on time. In some embodiments, the timer 112 may trigger an internal interrupt for the processor 104.

In some embodiments, the input device 114 permits an input into the system 100. For example, the input device 114 may comprise a keyboard, a mouse, a display, a touchscreen, a touchless screen, a button, a switch, an input port, speech recognition logic, and/or some other type of suitable visual, auditory, or tactile input component. The output device 116 permits an output from the system 100. For example, the output device 116 may include a speaker, a display, a touchscreen, a touchless screen, a projected display, a light, an output port, and/or some other type of suitable visual, auditory, or tactile output component.

The communication interface 118 permits the system 100 to communicate with other devices, networks, systems, sensors, and/or the like on a network. The communication interface 118 may include one or multiple wireless interfaces and/or wired interfaces. For example, the communication interface 118 may include one or multiple transmitters and receivers, or transceivers. The communication interface 118 may operate according to a protocol stack and a communication standard. In some embodiments, the communication interface 118 includes an antenna. The communication interface 118 may include various processing logic or circuitry (e.g., multiplexing/de-multiplexing, filtering, amplifying, converting, error correction, etc.). In some embodiments, the communication interface 118 operates using a long range wireless protocol, such as a cellular protocol or a WiFi protocol, a short range protocol, such as BLUETOOTH™, or a wired protocol, such as Ethernet.

In some embodiments, the interrupt blocking unit 120 selectively blocks or allows non-secure interrupts from being seen by the processor 104 based on the operating state of the processor 104. For example, when operating in the secure state, some or all non-secure interrupts may be blocked by the interrupt blocking unit 120. The operating state of the processor may be determined based on a current non-secure state signal, CURRNS, provided by the processor 104. In some embodiments, an ALLOW_NS signal, set by bit in a hardware register, has a logical "1" value when non-secure interrupts are allowed and a logic "0" value when non-secure interrupts are to be blocked (e.g., some or all). In some embodiments, the CURRNS has a logical "1" value when the processor 104 is in a non-secure state and a logic "0" value when the processor 104 is in a secure state. The ALLOW_NS signal and the CURRNS signals are processor operating mode parameters indicating whether the non-secure interrupts should be blocked. De-asserting the ALLOW_NS (logic "0"), allows non-secure interrupts to be blocked at any time. In some embodiments, de-asserting the ALLOW_NS (logic "0"), allows non-secure interrupts to be blocked prior to the processor 104 entering the secure state. Subsequently, ALLOW_NS may be asserted (logic "1") after the processor 104 enters the secure state and de-asserts CURRNS (logic "0").

Figure 2:
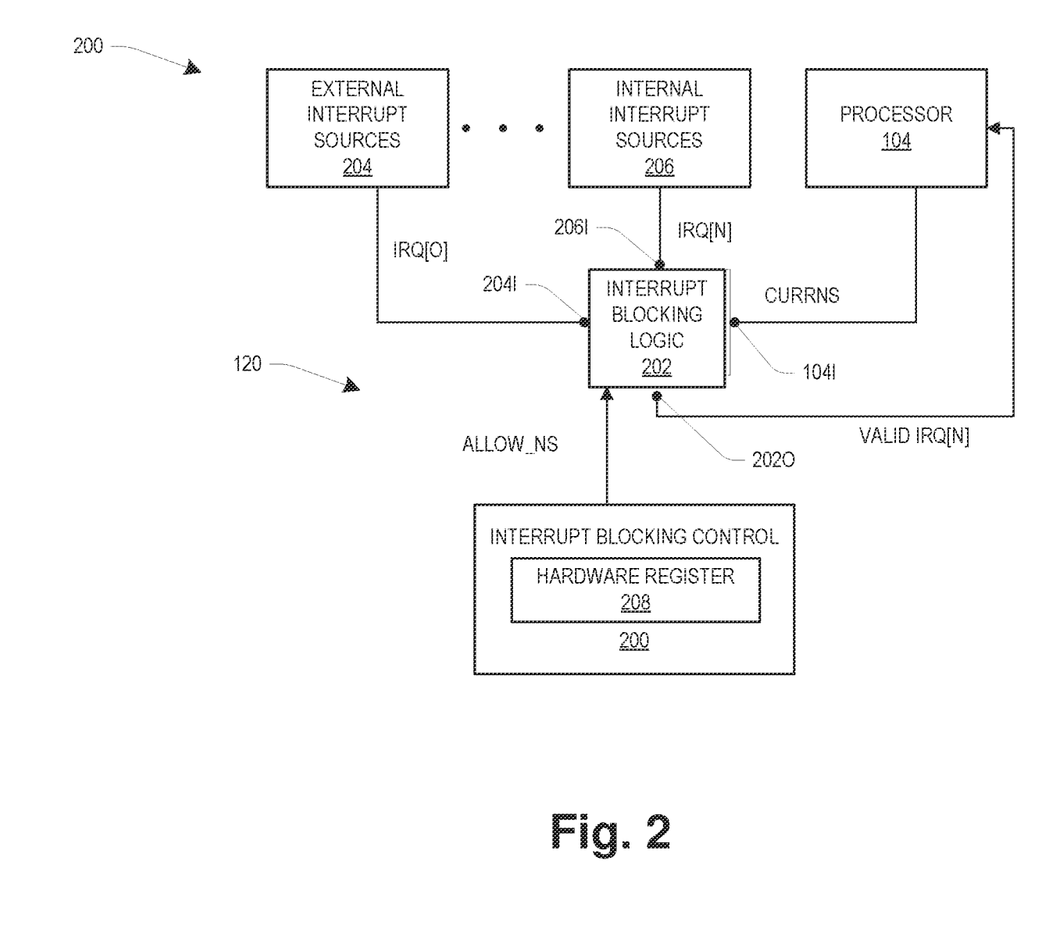
FIG. 2 is a diagram of an interrupt blocking unit, in accordance with some embodiments.

FIG. 2 is a diagram of the interrupt blocking unit 120, in accordance with some embodiments. The interrupt blocking unit 120 comprises an interrupt blocking control unit 200 and interrupt blocking logic 202. The interrupt blocking logic 202 blocks or allows interrupts, IRQ[N] from being sent to the processor 104. The interrupts may come from external interrupt sources 204, for example from the GPIO port 108, that are received at an external interrupt input port 2041 or internal interrupt sources 206, for example from the timer 112, that are received at an internal interrupt input port 2061. In some embodiments, the interrupt blocking control unit 200 comprises one or more hardware registers 208 for storing interrupt blocking flags for individual interrupts or for storing interrupt blocking enable data. For example, the hardware register 208 may be configured to identify which non-secure interrupts should be blocked responsive to the processor 104 being in a secure state, or whether global interrupt blocking should be enabled. In some embodiments, the processor 104 communicates the CURRNS signal to a processor state input port 1041 of the interrupt blocking logic 202 to indicate that the processor 104 is currently operating in a non-secure state by asserting CURRNS or operating in a secure state by de-asserting CURRNS. Interrupts, VALID IRQ[N], that are not blocked by the interrupt blocking logic 202 are provided at an interrupt output port 2020 to the processor 104.

Figure 3A:
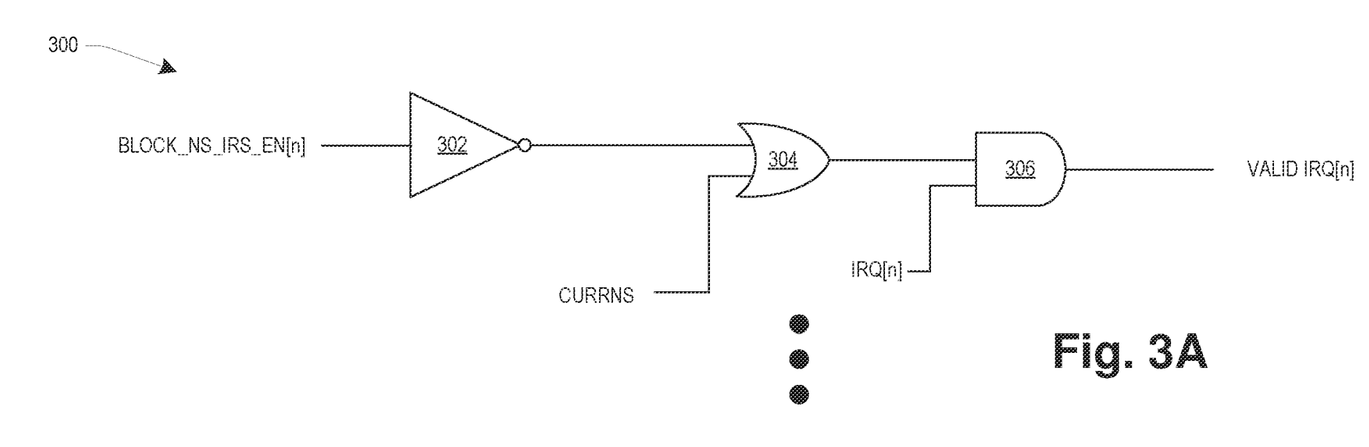
FIGS. 3A-3C and 4A-4C are diagrams of interrupt blocking logic, in accordance with some embodiments.
Figure 3B:
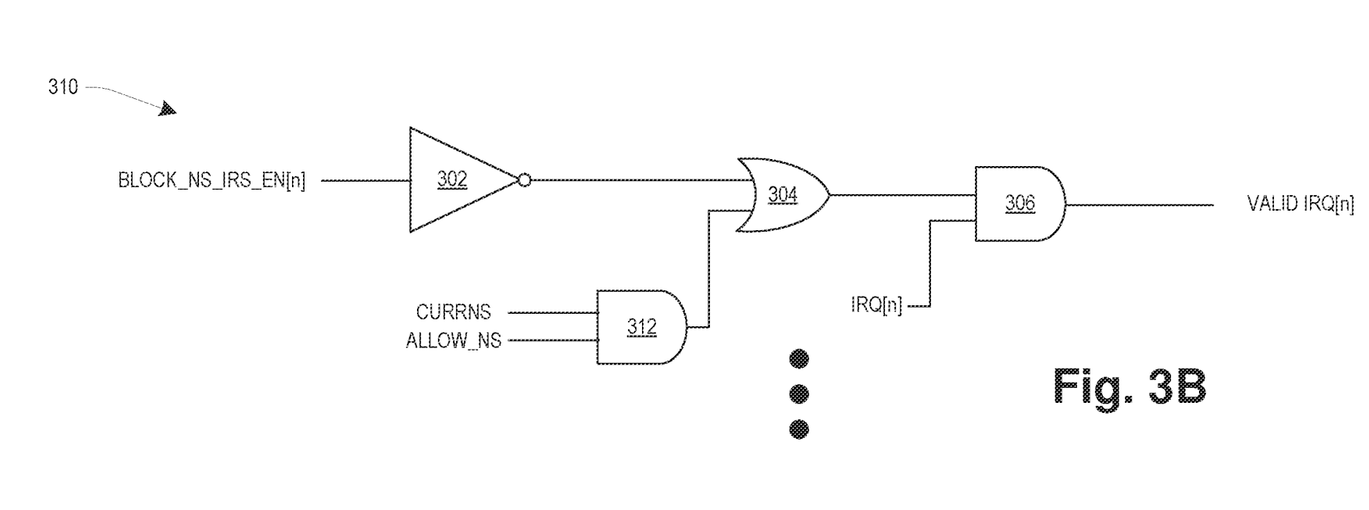
Figure 3C:
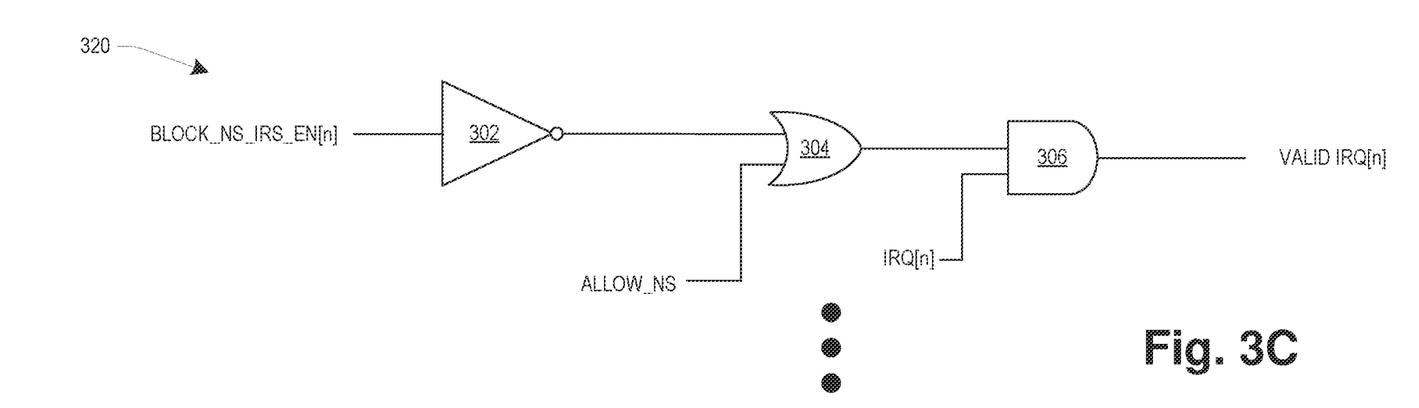

FIGS. 3A-3C and 4A-4C are diagrams of embodiments of the interrupt blocking logic 202, in accordance with some embodiments. FIGS. 3A-3C relate to selective blocking of individual non-secure interrupts and 4A-4C relate to blocking all non-secure interrupts.

Referring to FIG. 3A, interrupt blocking logic 300 comprises an inverter 302, an OR-gate 304, and an AND gate 306. The inverter 302 receives a block flag, BLOCK_NS_IRS_EN[n], that is associated with a selected non-secure interrupt and outputs a logic "1" responsive to the BLOCK_NS_IRS_EN[n] flag not being set (don't block). Responsive to the BLOCK_NS_IRS_EN[n] flag being set, the inverter 302 outputs a logic "0". Each non-secure interrupt in the system 100 has an associated BLOCK_NS_IRS_EN[n] flag, and the inverter 302, the OR gate 304, and the AND gate 306 are repeated for each non-secure interrupt in the system 100. In some embodiments, the BLOCK_NS_IRS_EN[n] flags may be stored in the hardware register 208.

In some embodiments, the OR gate 304 receives the CURRNS signal from the processor 104 and outputs a logic "1" responsive to the CURRNS signal being at a logic "1" indicating the processor 104 is in a non-secure state or responsive to the BLOCK_NS_IRS_EN[n] flag not being set. The AND gate 306 receives a non-secure interrupt, IRQ[n], and outputs a VALID IRQ[n] signal to the processor 104 responsive to the non-secure interrupt, IRQ[n] being received and the output of the OR gate 304 being a logic "1". Hence, the non-secure interrupt IRQ[n] is passed to the processor 104 responsive to the processor being in the non-secure state, based on CURNNS, or responsive to the blocking of the non-secure interrupt, IRQ[n], not being enabled by the BLOCK_NS_IRS_EN[n] flag. The non-secure interrupt IRQ[n] is blocked from being seen by the processor 104 responsive to the processor 104 being in the secure state, based on CURNNS, and responsive to blocking of the non-secure interrupt, IRQ[n], being enabled by the BLOCK_NS_IRS_EN[n] flag.

Referring to FIG. 3B, interrupt blocking logic 310 comprises the inverter 302, the OR-gate 304, the AND gate 306, and an additional AND gate 312 coupled to an input of the OR gate 304. The inverter 302 receives a block non-secure interrupts enable signal, BLOCK_NS_IRS_EN[n], that is associated with a selected non-secure interrupt and outputs a logic "1" responsive to the BLOCK_NS_IRS_EN[n] flag not being set (don't block). Responsive to the BLOCK_NS_IRS_EN[n] flag being set, the inverter 302 outputs a logic "0". Each non-secure interrupt in the system 100 has an associated BLOCK_NS_IRS_EN[n] flag, and the inverter 302, the OR gate 304, and the AND gates 306, 312 are repeated for each non-secure interrupt in the system 100. In some embodiments, the BLOCK_NS_IRS_EN[n] flags may be stored in the hardware register 208.

In some embodiments, the AND gate 312 outputs a logic "1" responsive to the CURRNS signal being at a logic "1" indicating that the processor 104 is in a non-secure state and a hardware signal, ALLOW_NS, being at a logic "1" indicating that non-secure interrupts are allowed. Thus, the ALLOW_NS signal provides a confirmation of the CURRNS signal. The OR gate 304 receives the output from the AND gate 312 and output a logic "1" responsive to the CURNNS signal and the ALLOW_NS signal being at a logic "1" or responsive to the BLOCK_NS_IRS_EN[n] flag not being set. The AND gate 306 receives a non-secure interrupt, IRQ[n], and outputs a VALID IRQ[n] signal to the processor 104 responsive to the non-secure interrupt, IRQ[n] being received and the output of the OR gate 304 being a logic "1". Hence, the non-secure interrupt IRQ[n] is passed to the processor 104 responsive to the processor being in the non-secure state, based on CURNNS and ALLOW_NS both being at a logic "1", or responsive to blocking of the non-secure interrupt, IRQ[n], not being enabled by the BLOCK_NS_IRS_EN[n] flag. The non-secure interrupt IRQ[n] is blocked from being seen by the processor 104 responsive to either CURNNS or ALLOW_NS being at a logic "0" and responsive to the blocking of the non-secure interrupt, IRQ[n], being enabled by the BLOCK_NS_IRS_EN[n] flag.

Referring to FIG. 3C, interrupt blocking logic 320 comprises the inverter 302, the OR-gate 304, and the AND gate 306, however, the CURRNS signal is omitted and the OR gate 304 is controlled by the ALLOW_NS signal. The inverter 302 receives a block non-secure interrupts enable signal, BLOCK_NS_IRS_EN[n], that is associated with a selected non-secure interrupt and outputs a logic "1" responsive to the BLOCK_NS_IRS_EN[n] flag not being set (don't block). Responsive to the BLOCK_NS_IRS_EN[n] flag being set, the inverter 302 outputs a logic "0". Each non-secure interrupt in the system 100 has an associated BLOCK_NS_IRS_EN[n] flag, and the inverter 302, the OR gate 304, and the AND gate 306 are repeated for each non-secure interrupt in the system 100. In some embodiments, the BLOCK_NS_IRS_EN[n] flags may be stored in the hardware register 208.

In some embodiments, the OR gate 304 receives the ALLOW_NS signal and outputs a logic "1" responsive to the ALLOW_NS signal being at a logic "1" indicating the processor 104 is in a non-secure state or responsive to the BLOCK_NS_IRS_EN[n] flag not being set. The AND gate 306 receives a non-secure interrupt, IRQ[n], and outputs a VALID IRQ[n] signal to the processor 104 responsive to the non-secure interrupt, IRQ[n] being received and the output of the OR gate 304 being a logic "1". Hence, the non-secure interrupt IRQ[n] is passed to the processor 104 responsive to the processor 104 being in the non-secure state, based on ALLOW_NS, or responsive to blocking of the non-secure interrupt, IRQ[n], not being enabled by the BLOCK_NS_IRS_EN[n] flag. The non-secure interrupt IRQ[n] is blocked from being seen by the processor 104 responsive to the ALLOW_NS being at a logic "1", and responsive to blocking of the non-secure interrupt, IRQ[n], being enabled by the BLOCK_NS_IRS_EN[n] flag.

Figure 4A:
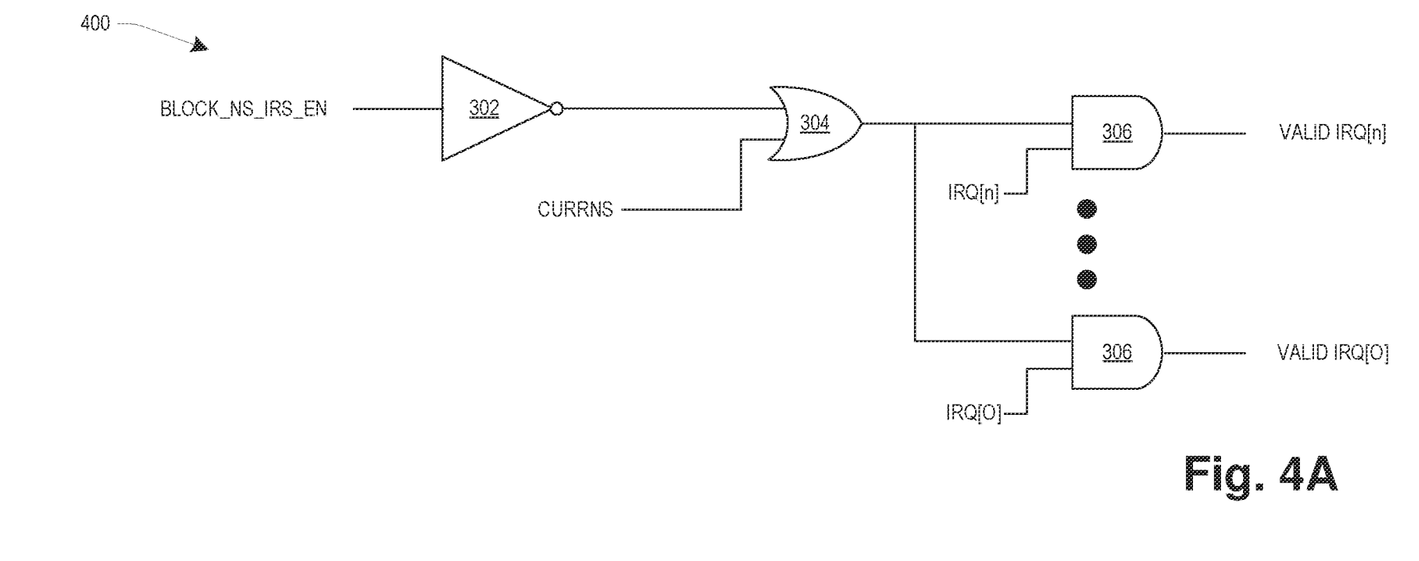
Figure 4B:
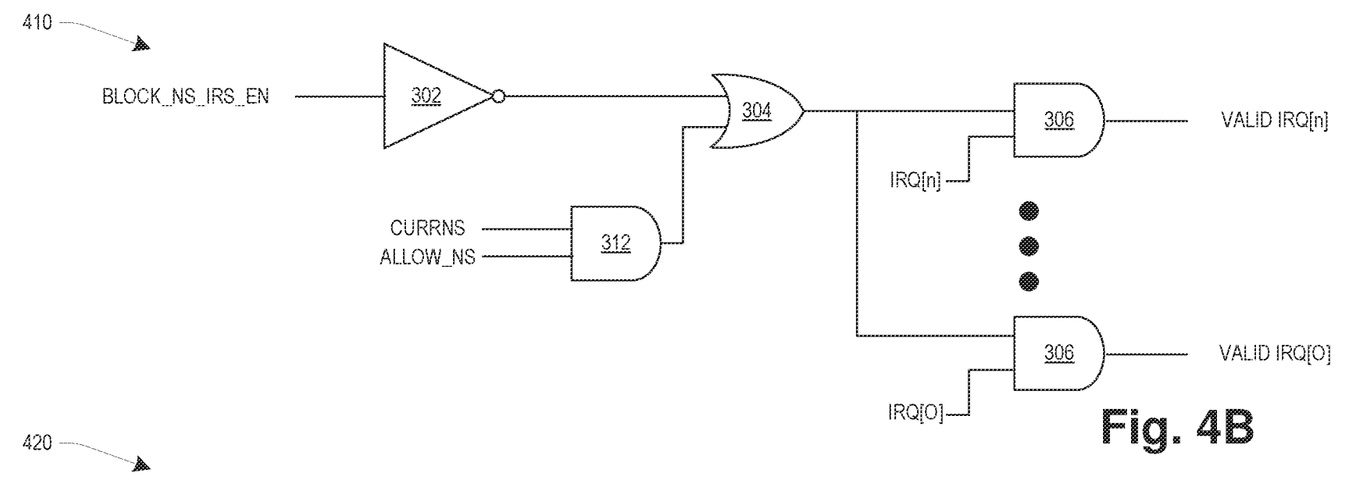
Figure 4C:
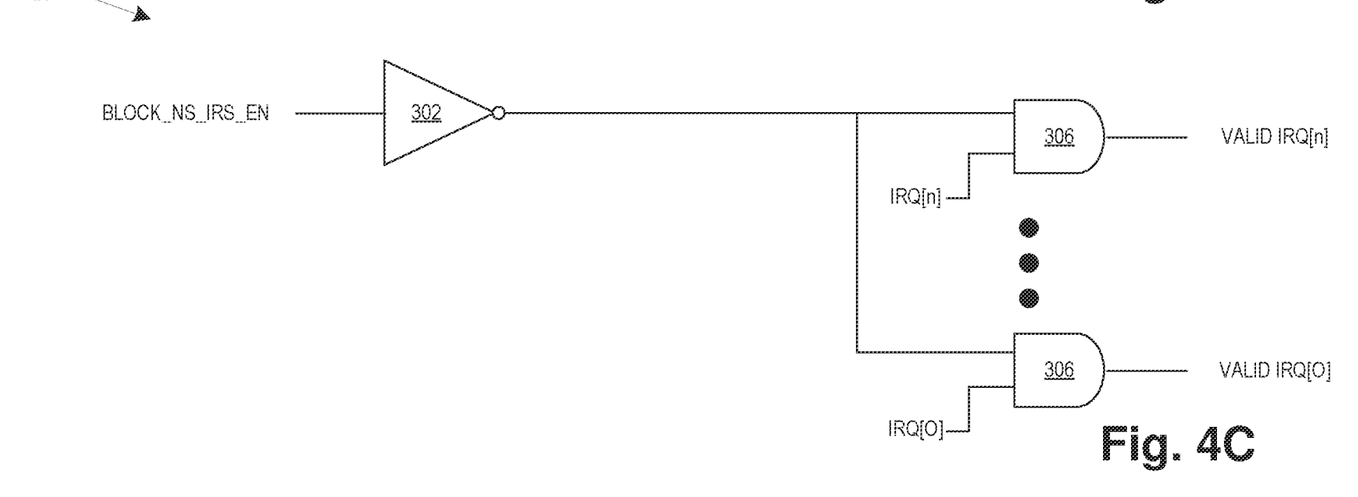

In FIGS. 4A-4C blocking of each non-secure interrupt is not enabled individually, but rather non-secure interrupt blocking is enabled or disabled for all non-secure interrupts in the system 100 based on a block flag provided by a BLOCK_NS_IRS_EN signal.

Referring to FIG. 4A, interrupt blocking logic 400 comprises the inverter 302, the OR-gate 304, and the AND gate 306. The inverter 302 receives a global block flag, BLOCK_NS_IRS_EN, that indicates that blocking of all non-secure interrupts is enabled and outputs a logic "1" responsive to the BLOCK_NS_IRS_EN signal being at a logic "0" (don't block). Responsive to the BLOCK_N-S_IRS_EN signal being asserted at a logic "1", the inverter 302 outputs a logic "0". The AND gates 306 are repeated for each non-secure interrupt in the system 100. In some embodiments, the BLOCK_NS_IRS_EN signal state may be stored in the hardware register 208.

In some embodiments, the OR gate 304 receives the CURRNS signal from the processor 104 and outputs a logic "1" responsive to the CURRNS signal being at a logic "1" indicating the processor 104 is in a non-secure state or responsive to the BLOCK_NS_IRS_EN signal not being at a logic "1". The AND gate 306 receives a non-secure interrupt, IRQ[n], and outputs a VALID IRQ[n] signal to the processor 104 responsive to the non-secure interrupt, IRQ[n] being received and the output of the OR gate 304 being a logic "1". Hence, the non-secure interrupt IRQ[n] is passed to the processor 104 responsive to the processor 104 being in the non-secure state, based on CURNNS, or responsive to blocking of the non-secure interrupts, IRQ[n], not being enabled by the BLOCK_NS_IRS_EN signal. The non-secure interrupt IRQ[n] is blocked from being seen by the processor 104 responsive to the processor 104 being in the secure state, based on CURNNS, and responsive to blocking of the non-secure interrupt, IRQ[n], being enabled by the BLOCK_NS_IRS_EN signal.

Referring to FIG. 4B, interrupt blocking logic 410 comprises the inverter 302, the OR-gate 304, the AND gate 306, and the additional AND gate 312 coupled to an input of the OR gate 304. The inverter 302 receives a block non-secure interrupts enable signal, BLOCK_NS_IRS_EN, and outputs a logic "1" responsive to the BLOCK_NS_IRS_EN signal being at a logic "0" (don't block). Responsive to the BLOCK_NS_IRS_EN signal being asserted at a logic "1", the inverter 302 outputs a logic "0". The AND gates 306 are repeated for each non-secure interrupt in the system 100. In some embodiments, the BLOCK_NS_IRS_EN signal state may be stored in the hardware register 208.

In some embodiments, the AND gate 312 outputs a logic "1" responsive to the CURRNS signal being at a logic "1" indicating that the processor 104 is in a non-secure state and the hardware signal, ALLOW_NS, being at a logic "1" indicating that non-secure interrupts are allowed. Thus, the ALLOW_NS signal provides a confirmation of the CURRNS signal. The OR gate 304 receives the output from the AND gate 312 and output a logic "1" responsive to the CURRNS signal and the ALLOW_NS signal being at a logic "1" or responsive to the BLOCK_NS_IRS_EN signal not being at a logic "1". The AND gate 306 receives a non-secure interrupt, IRQ[n], and outputs a VALID IRQ[n] signal to the processor 104 responsive to the non-secure interrupt, IRQ[n] being received and the output of the OR gate 304 being a logic "1".

Hence, the non-secure interrupt IRQ[n] is passed to the processor 104 responsive to the processor 104 being in the non-secure state, based on CURNNS and ALLOW_NS both being at a logic "1", or responsive to blocking of the non-secure interrupt, IRQ[n], not being enabled by the BLOCK_NS_IRS_EN[n] flag. The non-secure interrupt IRQ[n] is blocked from being seen by the processor 104 responsive to either CURNNS or ALLOW_NS being at a logic "0" and responsive to blocking of the non-secure interrupt, IRQ[n], being enabled by the BLOCK_N-S_IRS_EN[n] flag.

Hence, the non-secure interrupt IRQ[n] is passed to the processor 104 responsive to the processor 104 being in the non-secure state, based on CURNNS and ALLOW_NS both being at a logic "1", or responsive to blocking of the non-secure interrupt, IRQ[n], not being enabled by the BLOCK_NS_IRS_EN signal. The non-secure interrupt IRQ[n] is blocked from being seen by the processor 104 either CURNNS or ALLOW_NS are at a logic "0" and responsive to blocking of the non-secure interrupt, IRQ[n], being enabled by the BLOCK_NS_IRS_EN signal.

Referring to FIG. 4C, interrupt blocking logic 420 comprises the inverter 302 and the AND gate 306, however, consideration of the state of the processor 104 based on the CURRNS signal and/or the ALLOW_NS signal is omitted. The inverter 302 receives the block non-secure interrupts enable signal, BLOCK_NS_IRS_EN, and outputs a logic "1" responsive to the BLOCK_NS_IRS_EN signal being at a logic "0" (don't block). Responsive to the BLOCK_N-S_IRS_EN signal being asserted at a logic "1", the inverter 302 outputs a logic "0". The AND gates 306 are repeated for each non-secure interrupt in the system 100. In some embodiments, the BLOCK_NS_IRS_EN signal state may be stored in the hardware register 208.

Hence, the non-secure interrupt IRQ[n] is passed to the processor 104 by the AND gate 306 responsive to blocking of the non-secure interrupt, IRQ[n], not being enabled by the BLOCK_NS_IRS_EN signal. The non-secure interrupt IRQ[n] is blocked from being seen by the processor 104 responsive to blocking of the non-secure interrupt, IRQ[n], being enabled by the BLOCK_NS_IRS_EN signal.

The interrupt blocking logic 300, 310, 320, 400, 410, 420 comprises logic devices having particular logic "1" and logic "0" values. In some embodiments, the sense of the logic signals may be revered, for example if a logic "0" I used to denote enabling of the blocking for the non-secure interrupt, and alternative logic devices may be provided to accomplish the same logical function based on the reversed sense. Any types of logic devices may be used, such as AND gates, NAND gates, OR gates, NOR gates, XOR gates, or other suitable logic devices.

Figure 5:
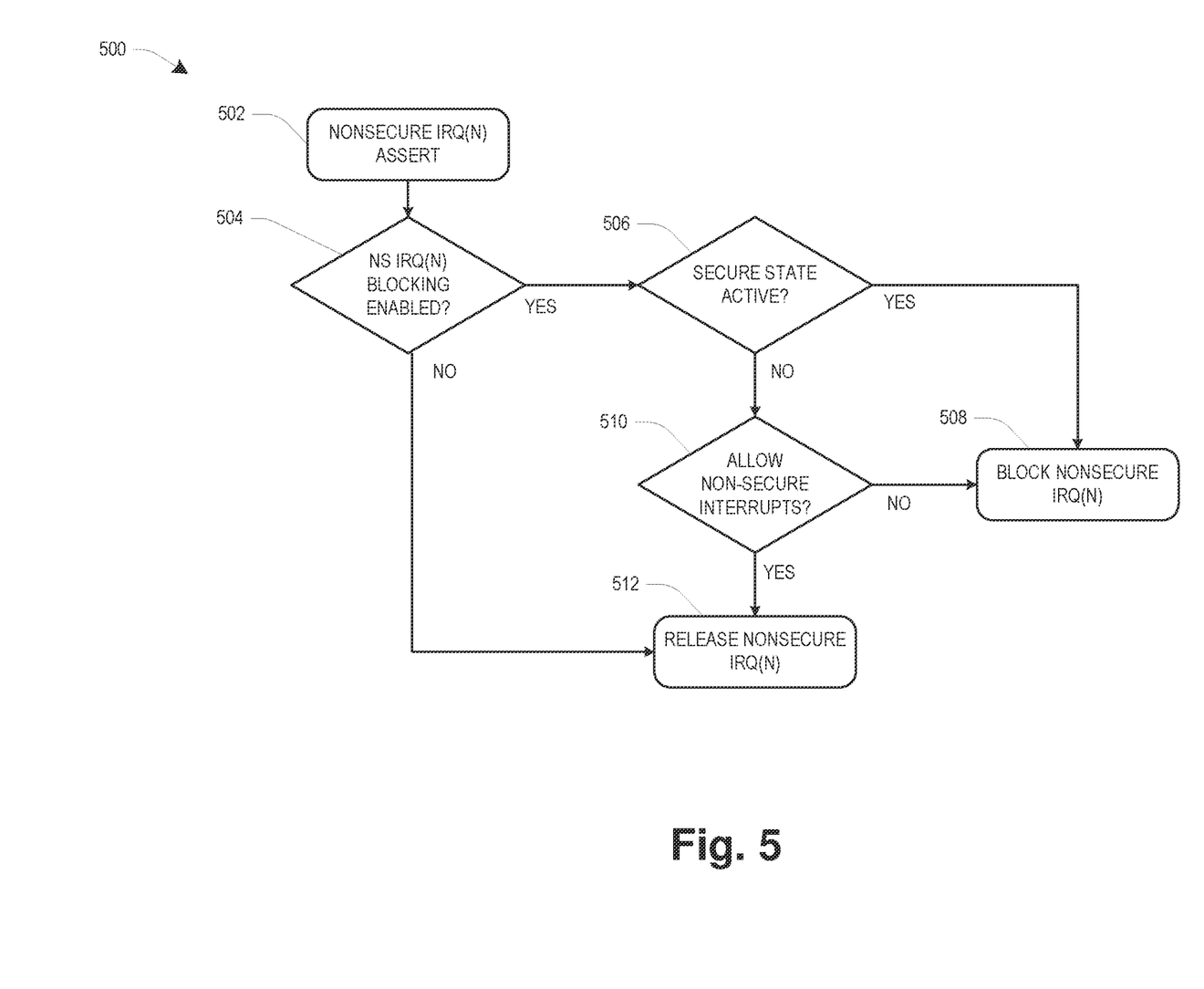
FIG. 5 is a flow chart illustrating an example method for blocking non-secure interrupts, in accordance with some embodiments.

FIG. 5 is a flow chart illustrating an example method 500 for blocking non-secure interrupts, in accordance with some embodiments. At 502 a non-secure interrupt IRQ[N] is asserted. The non-secure interrupt may comprise an interrupt from an external interrupt source 204, for example from the GPIO port 108, or an interrupt from an internal interrupt source 206, for example from the timer 112. At 504 it is determined if non-secure interrupt blocking is enabled for the non-secure interrupt IRQ[N]. For example, non-secure interrupt blocking may be individually enabled using the BLOCK_NS_IRS_EN[n] flags or based on the BLOCK_N-S_IRS_EN signal.

If non-secure interrupt blocking is enabled at 504, it is determined if the processor is in a secure state at 506. The state of the processor 104 may be determined based on the CURRNS signal, where the processor 104 is in the non-secure state responsive to the CURRNS signal being at a logic "1" and in the non-secure state responsive to the CURRNS signal being at a logic "0". If the processor 104 is in the secure state at 506, the non-secure interrupt IRQ[N] is blocked at 508.

If the processor 104 is not in the secure state at 506, it is determined if non-secure interrupts are allowed at 510. Non-secure interrupts are allowed or not allowed based on the ALLOW_NS signal. Non-secure interrupts are allowed responsive to the ALLOW_NS signal being at a logic "1" and non-secure interrupts are not allowed responsive to the ALLOW_NS signal being at a logic "0". If non-secure interrupts are not allowed at 510, the non-secure interrupt IRQ[N] is blocked at 508.

If non-secure interrupt blocking is not enabled for the non-secure interrupt IRQ[N] at 504, the non-secure interrupt IRQ[N] is released to the processor 104 at 512. If non-secure interrupts are allowed at 510, the non-secure interrupt IRQ[N] is released to the processor 104 at 512.

Figure 6:
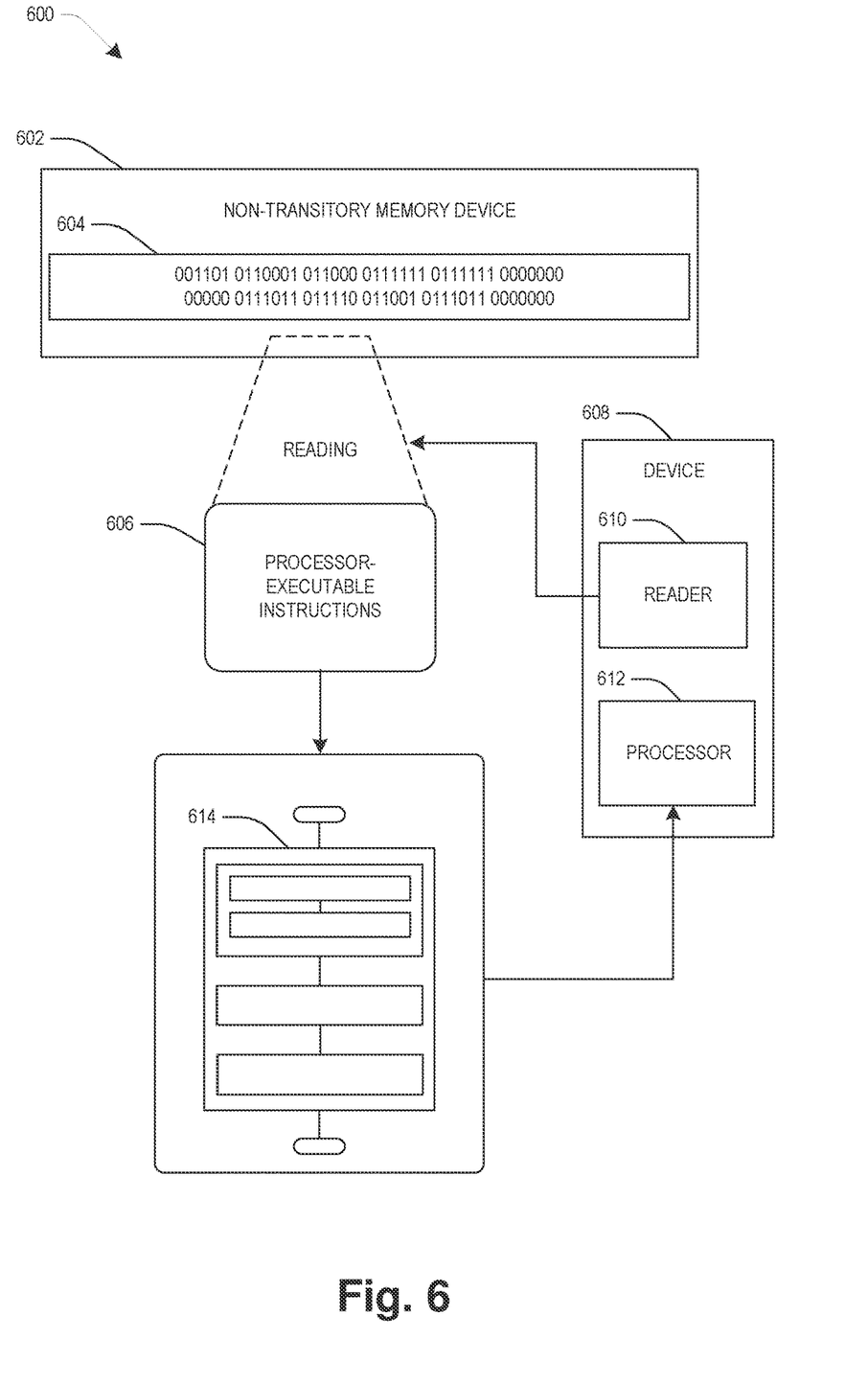
FIG. 6 illustrates an exemplary embodiment of a computer-readable medium, in accordance with some embodiments.

FIG. 6 illustrates an exemplary embodiment 600 of a computer-readable medium 602, in accordance with some embodiments. One or more embodiments involve a computer-readable medium comprising processor-executable instructions configured to implement one or more of the techniques presented herein. The embodiment 600 comprises a non-transitory computer-readable medium 602 (e.g., a CD-R, DVD-R, flash drive, a platter of a hard disk drive, etc.), on which is encoded computer-readable data 604. This computer-readable data 604 in turn comprises a set of processor-executable computer instructions 606 that, when executed by a computing device 608 including a reader 610 for reading the processor-executable computer instructions 606 and a processor 612 for executing the processor-executable computer instructions 606, are configured to facilitate operations according to one or more of the principles set forth herein. In some embodiments, the processor-executable computer instructions 606, when executed, are configured to facilitate performance of a method 614, such as at least some of the aforementioned method(s). In some embodiments, the processor-executable computer instructions 606, when executed, are configured to facilitate implementation of a system, such as at least some of the one or more aforementioned system(s). Many such computer-readable media may be devised by those of ordinary skill in the art that are configured to operate in accordance with the techniques presented herein.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

In an embodiment of the techniques presented herein, a system is provided. The system comprises a processor, a first interrupt source configured to generate a first non-secure interrupt, and an interrupt blocking unit configured to block the first non-secure interrupt responsive to the processor operating in a secure state.

In an embodiment of the techniques presented herein, the interrupt blocking unit is configured to provide the first non-secure interrupt to the processor responsive to the processor operating in a non-secure state.

In an embodiment of the techniques presented herein, the system comprises a second interrupt source configured to generate a second non-secure interrupt, wherein the interrupt blocking unit is configured to block the first non-secure interrupt responsive to the processor operating in the secure state and a first block flag being enabled, and provide the second non-secure interrupt to the processor responsive to a second block flag not being enabled.

In an embodiment of the techniques presented herein, the interrupt blocking unit comprises a hardware register configured to store the first block flag and the second block flag.

In an embodiment of the techniques presented herein, the processor is configured to generate a current non-secure state signal having a first value responsive to the processor operating in the secure state and having a second value responsive to the processor operating in a non-secure state, and the interrupt blocking unit configured to block the first non-secure interrupt responsive to current non-secure state signal having the first value and a first block flag being enabled.

In an embodiment of the techniques presented herein, the interrupt blocking unit comprises interrupt blocking logic, comprising an inverter having an input connected to receive the first block flag, an OR gate having a first input connected to an output of the inverter and a second input connected to receive the current non-secure state signal, and an AND gate having a first input connected to the output of the OR gate, a second input connected to receive the first non-secure interrupt, and an output connected to an interrupt port of the processor.

In an embodiment of the techniques presented herein, the interrupt blocking unit configured to block the first non-secure interrupt responsive to an allow non-secure interrupts parameter having a first value and a first block flag being enabled, and provide the first non-secure interrupt to the processor responsive to the allow non-secure interrupts parameter having a second value.

In an embodiment of the techniques presented herein, the interrupt blocking unit comprises interrupt blocking logic, comprising an inverter having an input connected to receive the first block flag, an OR gate having a first input connected to an output of the inverter and a second input connected to receive the allow non-secure interrupts parameter, and an AND gate having a first input connected to the output of the OR gate, a second input connected to receive the first non-secure interrupt, and an output connected to an interrupt port of the processor.

In an embodiment of the techniques presented herein, a system is provided. The system comprises a processor, a first interrupt source configured to generate a first non-secure interrupt, and an interrupt blocking unit configured to block the first non-secure interrupt responsive to the processor operating in a secure state.

In an embodiment of the techniques presented herein, the method comprises passing the first non-secure interrupt to a processor responsive to the processor operating mode signal indicating the processor is operating in a non-secure state.

In an embodiment of the techniques presented herein, the method comprises receiving a second non-secure interrupt, determining whether blocking is enabled for the second non-secure interrupt, and passing the second non-secure interrupt to a processor responsive to blocking not being enabled for the second non-secure interrupt.

In an embodiment of the techniques presented herein, the method comprises storing a first block flag indicating whether blocking is enabled for the first non-secure interrupt in a hardware register, and storing a second block flag indicating whether blocking is enabled for the second non-secure interrupt in the hardware register.

In an embodiment of the techniques presented herein, blocking the first non-secure interrupt based on a processor operating mode signal and responsive to the blocking being enabled for the first non-secure interrupt comprises receiving a current non-secure state signal from a processor, the current non-secure state signal having a first value responsive to the processor operating in the secure state and having a second value responsive to the processor operating in a non-secure state, and blocking the first non-secure interrupt responsive to the current non-secure state signal having the first value and the blocking being enabled for the first non-secure interrupt.

In an embodiment of the techniques presented herein, blocking the first non-secure interrupt based on a processor operating mode signal and responsive to the blocking being enabled for the first non-secure interrupt comprises receiving an allow non-secure interrupts parameter, the allow non-secure interrupts parameter having a first value responsive to non-secure interrupts being allowed and having a second value responsive to non-secure interrupts not being allowed, and blocking the first non-secure interrupt responsive to the allow non-secure interrupts parameter having the first value and the blocking being enabled for the first non-secure interrupt.

In an embodiment of the techniques presented herein, the method comprises storing a value of the processor operating mode signal in a hardware register.

In an embodiment of the techniques presented herein, an interrupt blocking unit is provided. The interrupt blocking unit comprises a first interrupt input port, a first interrupt output port, a hardware register configured to store a first block flag associated with the first interrupt input port and a processor operating mode parameter, and interrupt blocking logic configured to connect the first interrupt input port to the first interrupt output port responsive to the processor operating mode parameter having a first value and to isolate the first interrupt input port from the first interrupt output port responsive to the processor operating mode parameter having a second value and the first block flag having a first value.

In an embodiment of the techniques presented herein, the interrupt blocking comprises a second interrupt input port, and a second interrupt output port, wherein the hardware register is configured to store a second block flag associated with the second interrupt input port, and the interrupt blocking logic is configured to connect the second interrupt input port to the second interrupt output port responsive to the processor operating mode parameter having the first value and to isolate the first interrupt input port from the first interrupt output port responsive to the processor operating mode parameter having the second value and the second block flag having a first value.

In an embodiment of the techniques presented herein, the interrupt blocking comprises a second interrupt input port, and a second interrupt output port, wherein the first block flag comprises a global block flag, and the interrupt blocking logic is configured to connect the second interrupt input port to the second interrupt output port responsive to the processor operating mode parameter having the first value and to isolate the first interrupt input port from the first interrupt output port responsive to the processor operating mode parameter having the second value and the first block flag having the first value.

In an embodiment of the techniques presented herein, the interrupt blocking logic comprises an inverter having an input connected to the hardware register to receive first block flag, an OR gate having a first input connected to an output of the inverter and a second input connected to the hardware register to receive the processor operating mode parameter, and an AND gate having a first input connected to the output of the OR gate, a second input connected to the first interrupt input port, and an output connected to the first interrupt output port.

In an embodiment of the techniques presented herein, the interrupt blocking logic comprises an inverter connected to the first block flag, a first AND gate having a first input connected to a processor mode signal port and a second input connected to the hardware register to receive the processor operating mode parameter, an OR gate having a first input connected to an output of the inverter and a second input connected to the output of the first OR gate, and a second AND gate having a first input connected to the output of the OR gate, a second input connected to the first interrupt input port, and an output connected to the first interrupt output port.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system, comprising:
   a processor;
   a first interrupt source configured to generate a first non-secure interrupt;
   a second interrupt source configured to generate a second non-secure interrupt; and
   an interrupt blocking unit, comprising:

a hardware register configured to concurrently store a first block flag and a second block flag, wherein:
the interrupt blocking unit is configured to:
blockthe first non-secure interrupt responsive to the processor operating in a secure state and the first block flag being enabled; and
provide the second non-secure interrupt to the processor responsive to the processor operating in the secure state and the second block flag not being enabled.

2. The system of claim 1, wherein:
the interrupt blocking unit is configured to provide the first non-secure interrupt to the processor responsive to the processor operating in a non-secure state.

3. The system of claim 1, wherein:
the processor is configured to generate a current non-secure state signal having a first value responsive to the processor operating in the secure state and having a second value responsive to the processor operating in a non-secure state; and
the interrupt blocking unit is configured to block the first non-secure interrupt responsive to the current non-secure state signal having the first value and the first block flag being enabled.

4. The system of claim 3, wherein the interrupt blocking unit comprises interrupt blocking logic, comprising:
an inverter having an input connected to receive the first block flag;
an OR gate having a first input connected to an output of the inverter and a second input connected to receive the current non-secure state signal; and
an AND gate having a first input connected to an output of the OR gate, a second input connected to receive the first non-secure interrupt, and an output connected to an interrupt port of the processor.

5. The system of claim 1, wherein the interrupt blocking unit is configured to:
block the first non-secure interrupt responsive to an allow non-secure interrupts parameter having a first value and the first block flag being enabled; and
provide the first non-secure interrupt to the processor responsive to the processor operating in the secure state and the allow non-secure interrupts parameter having a second value.

6. The system of claim 5, wherein the interrupt blocking unit comprises interrupt blocking logic, comprising:
an inverter having an input connected to receive the first block flag;
an OR gate having a first input connected to an output of the inverter and a second input connected to receive the allow non-secure interrupts parameter; and
an AND gate having a first input connected to an output of the OR gate, a second input connected to receive the first non-secure interrupt, and an output connected to an interrupt port of the processor.

7. A method, comprising:
storing a first block flag indicating whether blocking is enabled for a first non-secure interrupt in a hardware register;
storing a second block flag indicating whether blocking is enabled for a second non-secure interrupt in the hardware register concurrently with the first block flag;
receiving the first non-secure interrupt;
blocking the first non-secure interrupt responsive to a processor operating mode signal indicating a processor is operating in a secure state and the first block flap being enabled for the first non-secure interrupt;
receiving the second non-secure interrupt; and
passing the second non-secure interrupt to the processor responsive to the processor operating mode signal indicating the processor is operating in the secure state and the second block flag not being enabled for the second non-secure interrupt.

8. The method of claim 7, comprising:
passing the first non-secure interrupt to the processor responsive to the processor operating mode signal indicating the processor is operating in a non-secure state.

9. The method of claim 7, comprising:
blocking the second non-secure interrupt to the processor responsive to the processor operating mode signal indicating the processor is operating in the secure state and the second block flag being enabled for the second non-secure interrupt.

10. The method of claim 7, wherein blocking the first non-secure interrupt comprises:
receiving a current non-secure state signal from the processor, the current non-secure state signal having a first value responsive to the processor operating in the secure state and having a second value responsive to the processor operating in a non-secure state; and
blocking the first non-secure interrupt responsive to the current non-secure state signal having the first value and the first block flag being enabled for the first non-secure interrupt.

11. The method of claim 7, wherein blocking the first non-secure interrupt comprises:
receiving an allow non-secure interrupts parameter, the allow non-secure interrupts parameter having a first value responsive to non-secure interrupts being allowed and having a second value responsive to non-secure interrupts not being allowed; and
blocking the first non-secure interrupt responsive to the allow non-secure interrupts parameter having the first value and the first block flag being enabled for the first non-secure interrupt.

12. The method of claim 7, comprising:
storing a value of the processor operating mode signal in a hardware register.

13. An interrupt blocking unit, comprising:
a first interrupt input port;
a first interrupt output port;
a second interrupt input port;
a second interrupt output port;
a hardware register configured to concurrently store a first block flag associated with the first interrupt input port, a second block flag associated with the second interrupt input port, and a processor operating mode parameter; and
interrupt blocking logic configured to:
connect the first interrupt input port to the first interrupt output port responsive to the processor operating mode parameter indicating the processor is operating in a secure state and the first block flag not being enabled and to isolate the first interrupt input port from the first interrupt output port responsive to the processor operating mode parameter indicating the processor is operating in the secure state and the first block flag being enabled; and
connect the second interrupt input port to the second interrupt output port responsive to the processor operating mode parameter indicating the processor is operating in the secure state and the second block flag not being enabled and to isolate the second interrupt input port from the second interrupt output port responsive to the processor operating mode parameter indicating the processor is operating in the secure state and the second block flag being enabled.

14. The interrupt blocking unit of claim 13, wherein:
the hardware register is configured to store a global block flag; and
the interrupt blocking logic is configured to connect the second interrupt input port to the second interrupt output port responsive to the processor operating mode parameter indicating the processor is operating in a non-secure state and the global block flag being enabled and to isolate the second interrupt input port from the second interrupt output port responsive to the processor operating mode parameter indicating the processor is operating in the secure state and the global block flag being enabled.

15. The interrupt blocking unit of claim 13, wherein the interrupt blocking logic comprises:
an inverter having an input connected to the hardware register to receive the first block flag;
an OR gate having a first input connected to an output of the inverter and a second input connected to the hardware register to receive the processor operating mode parameter; and
an AND gate having a first input connected to an output of the OR gate, a second input connected to the first interrupt input port, and an output connected to the first interrupt output port.

16. The interrupt blocking unit of claim 13, wherein the interrupt blocking logic comprises:
an inverter connected to the first block flag;
a first AND gate having a first input connected to a processor mode signal port and a second input connected to the hardware register to receive the processor operating mode parameter;
an OR gate having a first input connected to an output of the inverter and a second input connected to an output of the first AND OR gate; and
a second AND gate having a first input connected to an output of the OR gate, a second input connected to the first interrupt input port, and an output connected to the first interrupt output port.

17. The system of claim 1, wherein:
the interrupt blocking unit is configured to provide the first non-secure interrupt to the processor responsive to the processor operating in the non-secure state.

18. The system of claim 1, wherein:
the processor is configured to generate a current non-secure state signal having a first value responsive to the processor operating in the secure state and having a second value responsive to the processor operating in a non-secure state; and
the interrupt blocking unit is configured to:
provide the first non-secure interrupt to the processor responsive to the current non-secure state signal having the second value and an allow non-secure interrupts parameter being enabled.

19. The method of claim 7, comprising:
receiving a current non-secure state signal from the processor, the current non-secure state signal having a first value responsive to the processor operating in the secure state and having a second value responsive to the processor operating in a non-secure state; and
providing the first non-secure interrupt to the processor responsive to the current non-secure state signal having the second value and an allow non-secure interrupts parameter being enabled.

20. The interrupt blocking unit of claim 13, wherein:
the interrupt blocking logic is configured to:
receive a current non-secure state signal having a first value responsive to the processor operating in the secure state and having a second value responsive to the processor operating in a non-secure state; and
connect the first interrupt input port to the first interrupt output port responsive to the current non-secure state signal having the second value and an allow non-secure interrupts parameter being enabled.

* * * * *